United States Patent
Shen et al.

(10) Patent No.: US 12,488,108 B2
(45) Date of Patent: Dec. 2, 2025

(54) MEMORY DEVICE AND CONTROL METHOD FOR CONTROLLING MEMORY DEVICE

(71) Applicant: NANYA TECHNOLOGY CORPORATION, New Taipei (TW)

(72) Inventors: William Wu Shen, Taipei (TW); Hao-Huan Hsu, Taoyuan (TW); Tien Te Huang, New Taipei (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 223 days.

(21) Appl. No.: 18/350,753

(22) Filed: Jul. 12, 2023

(65) Prior Publication Data
US 2025/0021649 A1   Jan. 16, 2025

(51) Int. Cl.
*G06F 21/56* (2013.01)
*G06F 21/55* (2013.01)

(52) U.S. Cl.
CPC .......... *G06F 21/566* (2013.01); *G06F 21/554* (2013.01); *G06F 2221/034* (2013.01)

(58) Field of Classification Search
CPC ................... G06F 21/566; G06F 12/14; G06F 2212/1052; G06F 2221/034
See application file for complete search history.

(56) References Cited

U.S. PATENT DOCUMENTS

| | | | |
|---|---|---|---|
| 9,032,141 B2 | 5/2015 | Bains et al. | |
| 9,721,643 B2 | 8/2017 | Bains et al. | |
| 9,799,390 B2 | 10/2017 | Song | |
| 10,102,886 B2 | 10/2018 | Crawford et al. | |
| 10,825,534 B2 | 11/2020 | Nale | |
| 11,257,535 B2 | 2/2022 | Shore et al. | |
| 11,556,646 B2 * | 1/2023 | Purushotham | G06F 21/556 |
| 11,664,063 B2 | 5/2023 | Lovett | |
| 11,688,452 B2 | 6/2023 | Nale et al. | |
| 12,189,764 B2 * | 1/2025 | Agarwal | G11C 11/406 |
| 2014/0085995 A1 | 3/2014 | Greenfield et al. | |
| 2019/0066759 A1 | 2/2019 | Nale | |

(Continued)

FOREIGN PATENT DOCUMENTS

| | | |
|---|---|---|
| CN | 115705892 | 2/2023 |
| TW | 202322136 | 6/2023 |

OTHER PUBLICATIONS

"Office Action of Taiwan Counterpart Application", issued on May 14, 2024, p. 1-p. 7.

*Primary Examiner* — Christopher A Revak
(74) *Attorney, Agent, or Firm* — JCIPRNET

(57) ABSTRACT

A memory device and a control method of the memory device are provided. The memory device includes a memory array and a control logic circuit. The memory array includes a plurality of memory cell rows. The control logic circuit perform an access on the memory array. The control logic circuit counts a number of the access performed on the memory cell rows to generate a plurality of count values corresponding to the memory cell rows. When a count value corresponding to an accessed memory cell row among the memory cell rows is larger than or equal to a threshold value generated with random number corresponding to the accessed memory cell row, the control logic circuit arranges the memory cell rows nearby the accessed memory cell row into a mitigation operation.

15 Claims, 9 Drawing Sheets

(56) References Cited

U.S. PATENT DOCUMENTS

| | | |
|---|---|---|
| 2020/0210278 A1* | 7/2020 | Rooney ............... G06F 11/1004 |
| 2022/0115057 A1* | 4/2022 | Pope ................. G11C 11/40611 |
| 2022/0129200 A1 | 4/2022 | Van Der Veen et al. |
| 2023/0047007 A1 | 2/2023 | Lovett |
| 2023/0125774 A1* | 4/2023 | Yen ..................... G11C 11/4087 |
| | | 365/222 |
| 2024/0096395 A1* | 3/2024 | Cho ....................... G11C 11/408 |
| 2024/0119985 A1* | 4/2024 | Benedict ............... G11C 11/408 |
| 2024/0221815 A1* | 7/2024 | Kim .......................... G11C 7/02 |
| 2025/0104757 A1* | 3/2025 | Woo ................. G11C 11/40603 |

\* cited by examiner

MEMORY DEVICE AND CONTROL METHOD FOR CONTROLLING MEMORY DEVICE

BACKGROUND

Technical Field

The disclosure generally relates to a memory device and a control method for controlling the memory device, and more particularly to a memory device and a control method for mitigating a row-hammer attacks.

Description of Related Art

Generally, a memory device performs a mitigation operation on memory cell rows in a memory array to prevent row-hammer event. When an access number on a memory cell row reaches a threshold value. The memory device performs the mitigation operation to refresh the memory cell rows nearby the memory cell row been frequently accessed within a short time period.

However, external attackers (for example, hacker or malicious program) obtain the mitigation operation according to the threshold value. Thus, according to the threshold value, the external attackers may focus on writing to a specific memory cell row or make lots of access numbers reach the threshold value within a very short period. Above row-hammer attacks may make the memory device busy to decrease an efficacy of the memory device or disturb the specific memory cell. Therefore, how to mitigating the row-hammer attacks is one of the research and development focuses of those skilled in the art.

SUMMARY

The disclosure provides a memory device and a control method of the memory device for mitigating a row-hammer attacks on the memory device.

The memory device includes a memory array and a control logic circuit. The memory array includes a plurality of memory cell rows. The control logic circuit is coupled to the memory array. The control logic circuit performs an access on the memory array. The control logic circuit includes a counter, a random value generator and a comparator. The counter counts a number of the access performed on the memory cell rows to generate a count value corresponding to the accessed memory cell row among the plurality of memory cell rows. The random value generator generates a threshold value with random value corresponding to the accessed memory cell row. The comparator compares the threshold value and the count value. When the count value corresponding to the accessed memory cell row is larger than or equal to the threshold value, the control logic circuit arranges the memory cell rows nearby the accessed memory cell row into a mitigation operation.

The control method is used for controlling a memory device. The control method includes: providing a count value corresponding to an accessed memory cell row among a plurality of memory cell rows; reading the count value stored in the accessed memory cell row; generating a threshold value with a random number corresponding to the accessed memory cell row; comparing the count value and the threshold value; and arranging the memory cell rows nearby the accessed memory cell row into a mitigation operation when the count value is larger than or equal to the threshold value.

Based on the above, the threshold values are random values respectively. External attackers (for example, hacker or malicious program) cannot obtain the threshold values. The external attacker cannot obtain the mitigation operation of the disclosure. Therefore, the memory device mitigates a row-hammer attacks.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "but the disclosure is not limited thereto". Thus, when the terms "include", "comprise" and/or "have" are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being "coupled to", "connected to", or "conducted to" another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Figure 1:
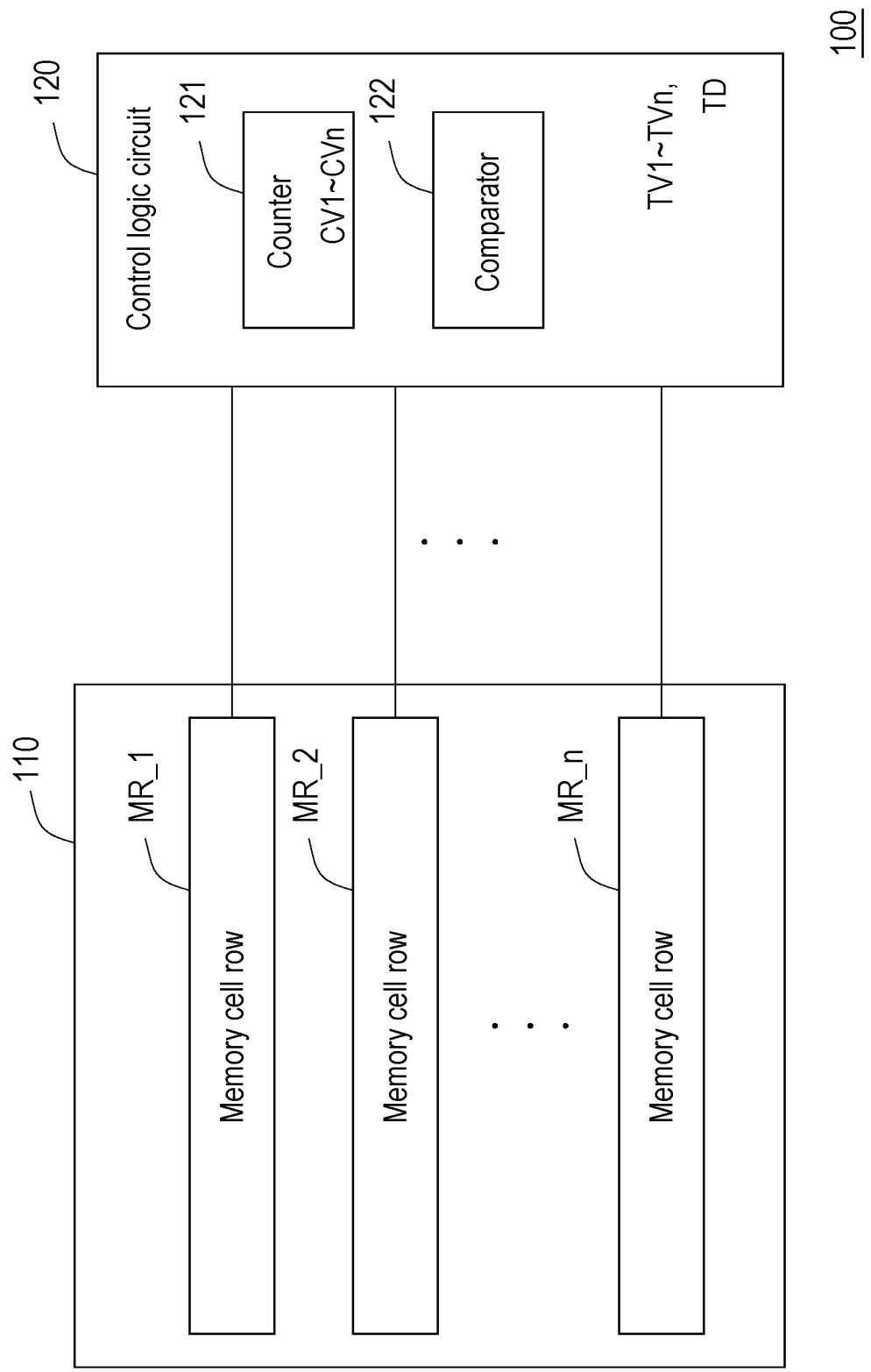
FIG. 1 illustrates a schematic diagram of a memory device according to a first embodiment of the disclosure.

FIG. 1 illustrates a schematic diagram of a memory device according to a first embodiment of the disclosure. Please refer to FIG. 1, in the embodiment, the memory device 100 includes a memory array 110 and a control logic circuit 120. The memory array 110 may be a DRAM memory array, but the disclosure is not limited thereto. The memory array 110 includes memory cell rows MR_1 to MR_n. The control logic circuit 120 is coupled the memory array 110. The control logic circuit performs an access on the memory array. In the embodiment, the control logic circuit 120 includes a counter 121 and a comparator 122. The counter 121 counts a number of the access performed on the memory cell rows to generate count values CV1 to CVn corresponding to the memory cell rows MR_1 to MR_n. For example, the count value CV1 is a number of the access performed on the memory cell row MR_1. The count value CV2 is a number of the access performed on the memory cell row MR_2, and so on.

The comparator 122 compares threshold values TV1 to TVn corresponding to the memory cell rows and the count values CV1 to CVn. For example, the threshold value TV1 corresponds to the memory cell row MR_1. The comparator 122 compares threshold value TV1 and the count value CV1 to generate a first result. The threshold value TV2 corresponds to the memory cell row MR_2. The comparator 122 compares threshold value TV2 and the count value CV2 to generate a second result, and so on.

In the embodiment, the control logic circuit 120 resets the count values CV1 to CVn based on a time length TD and sets the threshold values TV1 to TVn based on the time length TD. In the embodiment, the threshold values TV1 to TVn are random values respectively.

For example, the time length TD is associated with a refresh period of the memory array 110. For example, the time length TD may be 32 milli second, but the disclosure is not limited thereto. Thus, the time length TD is a refresh period of the memory array 110. The count values CV1 to CVn are reset per the time length TD. Besides, the threshold values TV1 to TVn are set again based on the time length TD.

It should be noted, the threshold values TV1 to TVn are random values respectively and are set again based on the time length TD. External attackers (for example, hacker or malicious program) cannot obtain the threshold values TV1 to TVn. The external attacker cannot obtain the mitigation operation of row-hammer. Therefore, the memory device 100 mitigates a row-hammer attacks from the external attackers.

In the embodiment, each the count values CV1 to CVn is stored in the corresponding rows respectively. For example, the count value CV1 is stored in the memory cell row MR_1. The count value CV2 is stored in the memory cell row MR_2, and so on.

The control logic circuit 120 performs the access on the memory array 110, and reads the count values CV1 to CVn. Taking the count value CV3 as an example, when the memory cell row MR_3 (that is, accessed memory cell row) is performed a write operation (for example, an internal write operation) of the access, the counter 121 increments the count value CV3. On the other hand, when the memory cell row MR_3 is not performed the write operation of the access, the counter 121 stops incrementing the count value CV3. The comparator 122 compares the count value CV3 and the threshold value TV3. When the count value CV3 is larger than or equal to the threshold value TV3, the comparator 122 notifies the control logic circuit 120. Thus, the control logic circuit 120 arranges the memory cell rows MR_1, MR_2, MR_4 and MR_5 nearby the memory cell row MR_3 into a mitigation operation (for example, recharge memory cell rows in a propriate time period). When the count value CV3 is lower than the threshold value TV3, the counter 121 increments the count value CV3 when the access is performed on the memory cell row MR_3. Besides, when the memory cell rows MR_1, MR_2, MR_4 and MR_5 nearby the memory cell row MR_3 been arranged into the mitigation operation, the control logic circuit 120 resets the count value CV3 as an initial value (for example, "0").

Taking a the count value CVm (not shown, the number "m" is lower than the number "n" by least "2") as an example, when a count value of the count value CVm is larger than or equal to the threshold value TVm, the control logic circuit 120 arranges the memory cell rows MR_(m−2), MR_(m−1), MR_(m+1) and MR_(m+2) into the mitigation operation.

In the embodiment, the counter 121 is a per-row-hammer-tracking (PRHT) counter.

In the embodiment, the control logic circuit 120 generates the threshold value when reading a corresponding count value. For example, the control logic circuit 120 generates the threshold value TV1 when reading the count value CV1. For example, the control logic circuit 120 generates the threshold value TV2 when reading the count value CV2.

Figure 2:
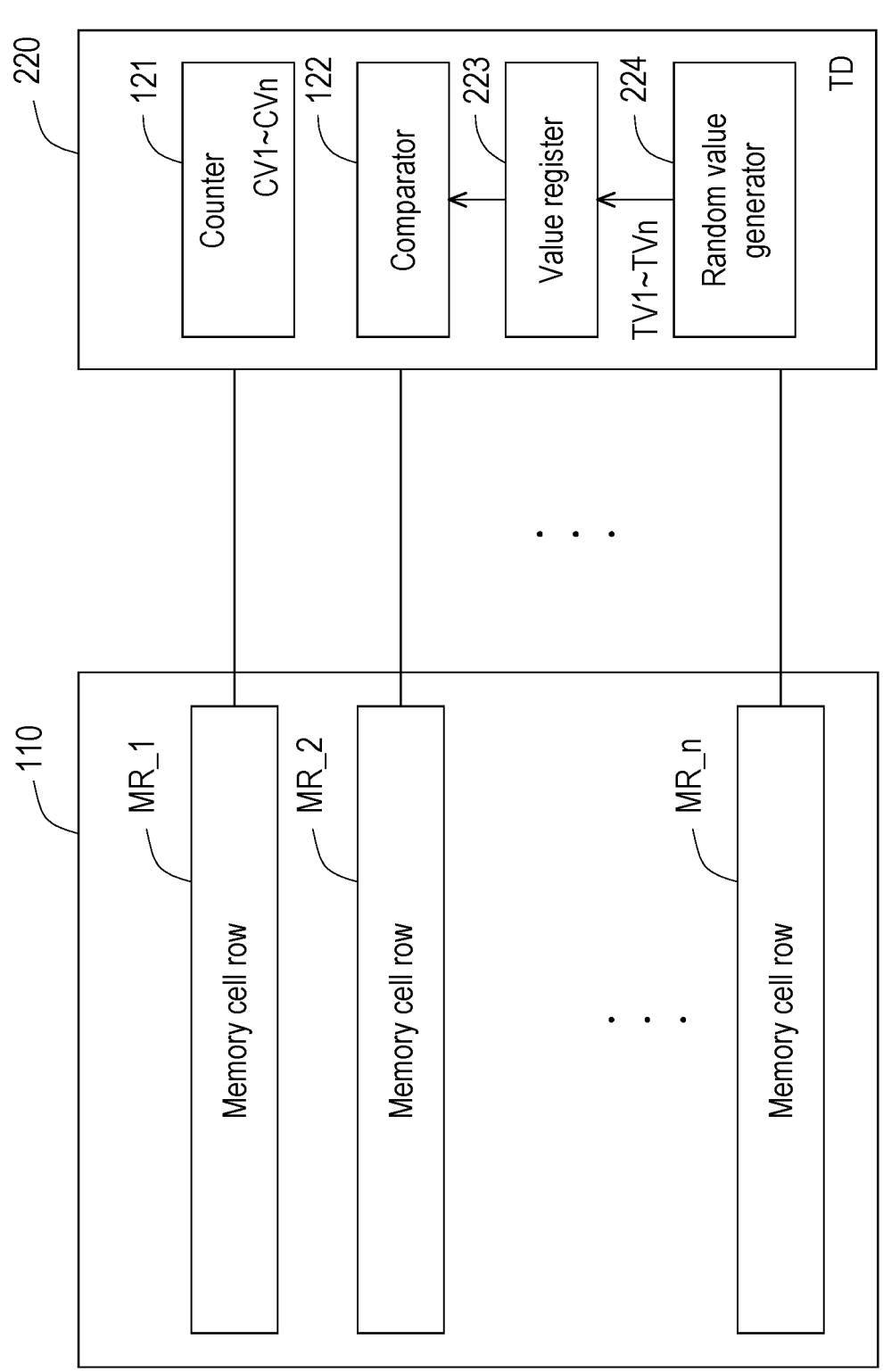
FIG. 2 illustrates a schematic diagram of a memory device according to a second embodiment of the disclosure.

FIG. 2 illustrates a schematic diagram of a memory device according to a second embodiment of the disclosure. Please refer to FIG. 2, in the embodiment, the memory device 200 includes the memory array 110 and a control logic circuit 220. The control logic circuit 220 includes the counter 121, the comparator 122, a value register 223 and a random value generator 224. The operation between the memory array 110, the counter 121 and the comparator 122 has been clearly explained in the embodiment of FIG. 1, so it will not be repeated here.

In the embodiment, the random value generator 224 is coupled to the value register 223. The random value generator 224 generates the threshold values TV1 to TVn. In the embodiment, when the control logic circuit 220 reads the count value CV1 from the accessed memory cell row MR_1, the random value generator 224 generates the first threshold value TV1 corresponding to the accessed memory cell row MR_1. When the control logic circuit 220 reads the count value CV2 from the accessed memory cell row MR_2, the random value generator 224 generates the first threshold value TV2 corresponding to the accessed memory cell row MR_2, and so on. Therefore, the external attackers cannot obtain the threshold value. The threshold values TV1 to TVn are random values respectively.

For example, the random value generator 224 generates the threshold values TV1 to TVn with a linear feedback shift register (LFSR). For example, the random value generator 224 includes a Fibonacci-type LFSR or a Galois-type LFSR. Thus, each of the threshold values TV1 to TVn is a random value having several bits. In the embodiment, the value register 223 stores the threshold values TV1 to TVn. For example, the value register 223 includes threshold value segments for storing the threshold values TV1 to TVn.

Figure 3:
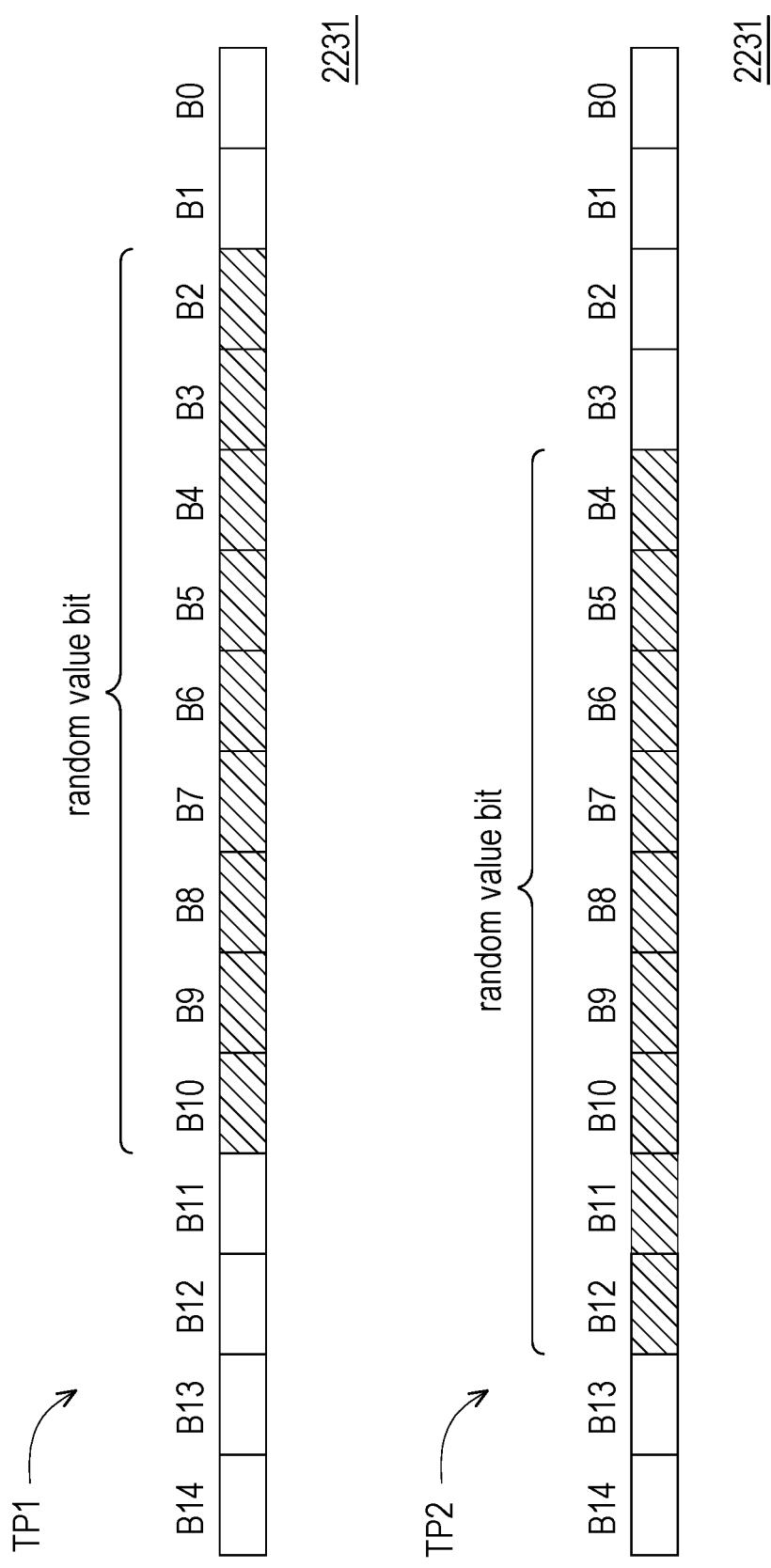
FIG. 3 illustrates a schematic diagram of a threshold value segment according to an embodiment of the disclosure.

FIG. 3 illustrates a schematic diagram of a threshold value segment according to an embodiment of the disclosure. Please refer to FIG. 2 and FIG. 3, in the embodiment, the threshold value segment 2231 of the value register 223 is used to store the threshold value TV1. The threshold value TV1 includes a first number of bits. For example, the threshold value segment 2231 is a segment having 15 bits B0 to B14, but the disclosure is not limited thereto. Thus, the threshold value TV1 is a 15-bits-value (that is, the first number is "15"), but the disclosure is not limited thereto. Besides, the threshold value TV1 includes a second number of bits in the first number are generated by the random value generator 224. For example, the threshold value TV1 includes 9 random value bits (that is, the second number is "9"), but the disclosure is not limited thereto. The first number is larger than or equal to the second number. Besides, the second number is larger than zero. Each of bit values of the random value bits is a random value. In a time point TP1, the bits B2 to B10 are set as the random value bits. For example, the time point TP1 is a time point for reading the count value CV1.

In a time point TP2, the bits B4 to B12 are set as the random value bits. For example, the random value bits of the threshold value TV1 in the threshold value segment 2231 are shifted based on the time length TD. For example, the random value bits of the threshold value TV1 in the threshold value segment 2231 are shifted based on a refresh period of the memory device. Besides, the threshold value TV1 is the random value changed. Therefore, it is not easy for the external attackers to know the threshold value TV1. For another embodiment, the time point TP2 could be another time point for reading the count value CV1.

Besides, the bits B13 and B14 are not set as the random value bits. Therefore, the threshold value TV1 would not be too low. For example, each bit value of the bits B13 and B14 is "1".

Figure 4:
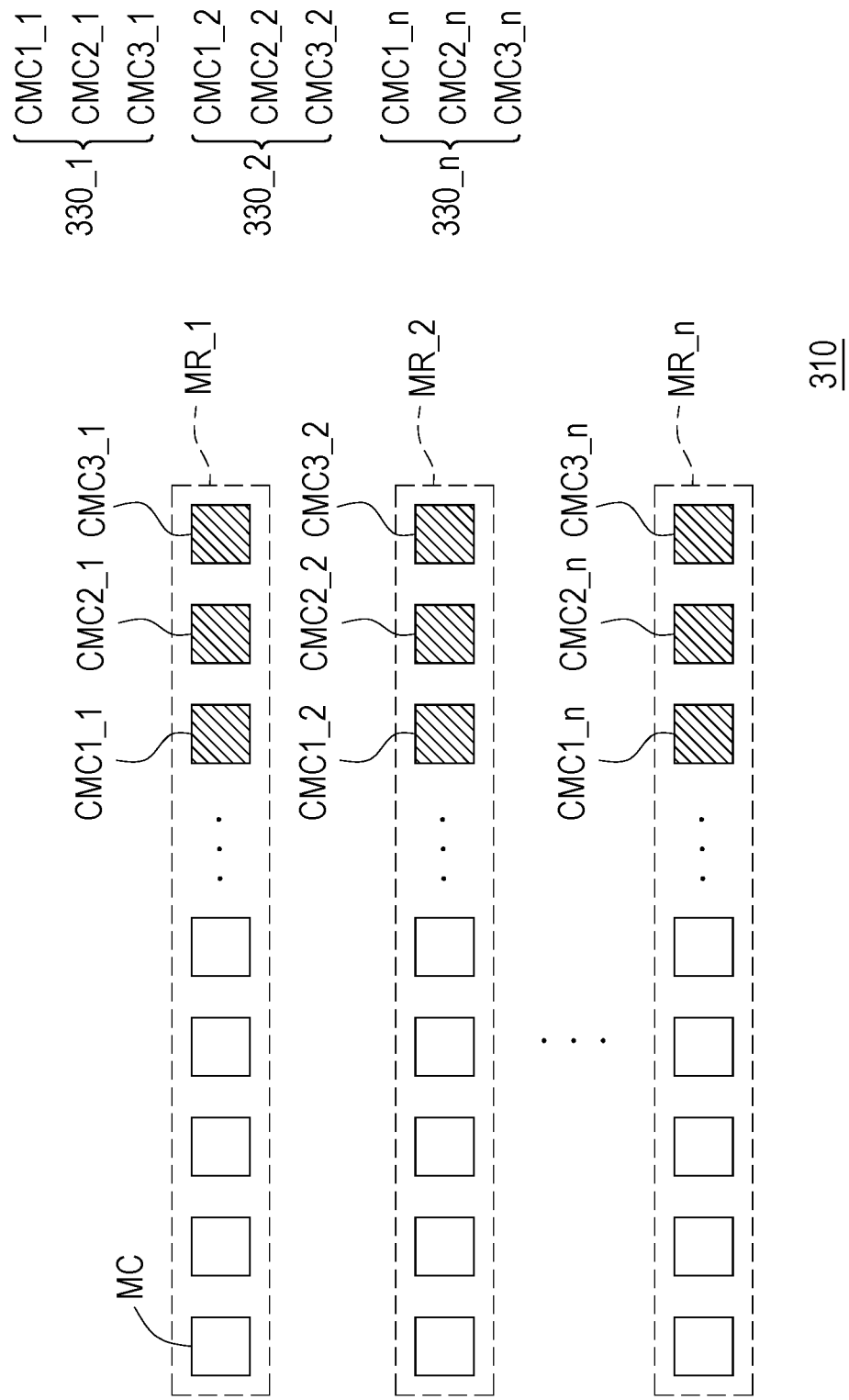
FIG. 4 illustrates a schematic diagram of a memory array according to an embodiment of the disclosure.

FIG. 4 illustrates a schematic diagram of a memory array according to an embodiment of the disclosure. Please refer to FIG. 4, in the embodiment, the memory array 310 includes memory cell rows MR_1 to MR_n. The memory cell rows MR_1 includes memory cells MC and a count value registers 330_1. The count value registers 330_1 includes memory cells CMC1-1 to CMC3-1 for storing the count value CV1. The memory cells CMC1-1 to CMC3-1 are adjacent to each other. The memory cell rows MR_2 includes memory cells MC and a count value registers 330_2. The count value registers 330_2 includes memory cells CMC1-2 to CMC3-2 for storing the count value CV2. The memory cells CMC1-2 to CMC3-2 are adjacent to each other. Similarly, the memory cell rows MR_n includes memory cells MC and a count value registers 330_n. The count value registers 330_n includes memory cells CMC1_n to CMC3_n for storing the count value CVn. The memory cells CMC1_n to CMC3_n are adjacent to each other.

In the embodiment, each of the memory cell rows MR_1~MR_n corresponds one different word line. For example, when the memory cell row MR_1 is asserted by a word line signal on a first word line, the count value CV1 stored in the count value registers 330_1 may be readout.

Besides, the memory cells CMC1-1 to CMC1_n are formed as a first memory cell column. The memory cells CMC2-1 to CMC2_n are formed as a second memory cell column. The memory cells CMC3-1 to CMC3_n are formed as a third memory cell column.

In the embodiment, each of the count value registers 330_1 to 330_n includes three memory cells for storing the corresponding count value, but the disclosure is not limited thereto. For example, based on the threshold value segment 2231 in FIG. 3, each of the count value registers 330_1 to 330_n may include 15-bits memory cells.

Taking the count value register 330_1 and the memory cell row MR_1 as an example, the control logic circuit 320 resets the count value register 330_1 by overwriting a reset data based on the default time length TD, and provides a write data to memory cells in the memory cell row MR_1 in the writing operation. For another example, the control logic circuit 320 resets the count value register 330_1 after arranging the memory cell rows nearby the memory cell row MR_1 into the mitigation operation.

Figure 5:
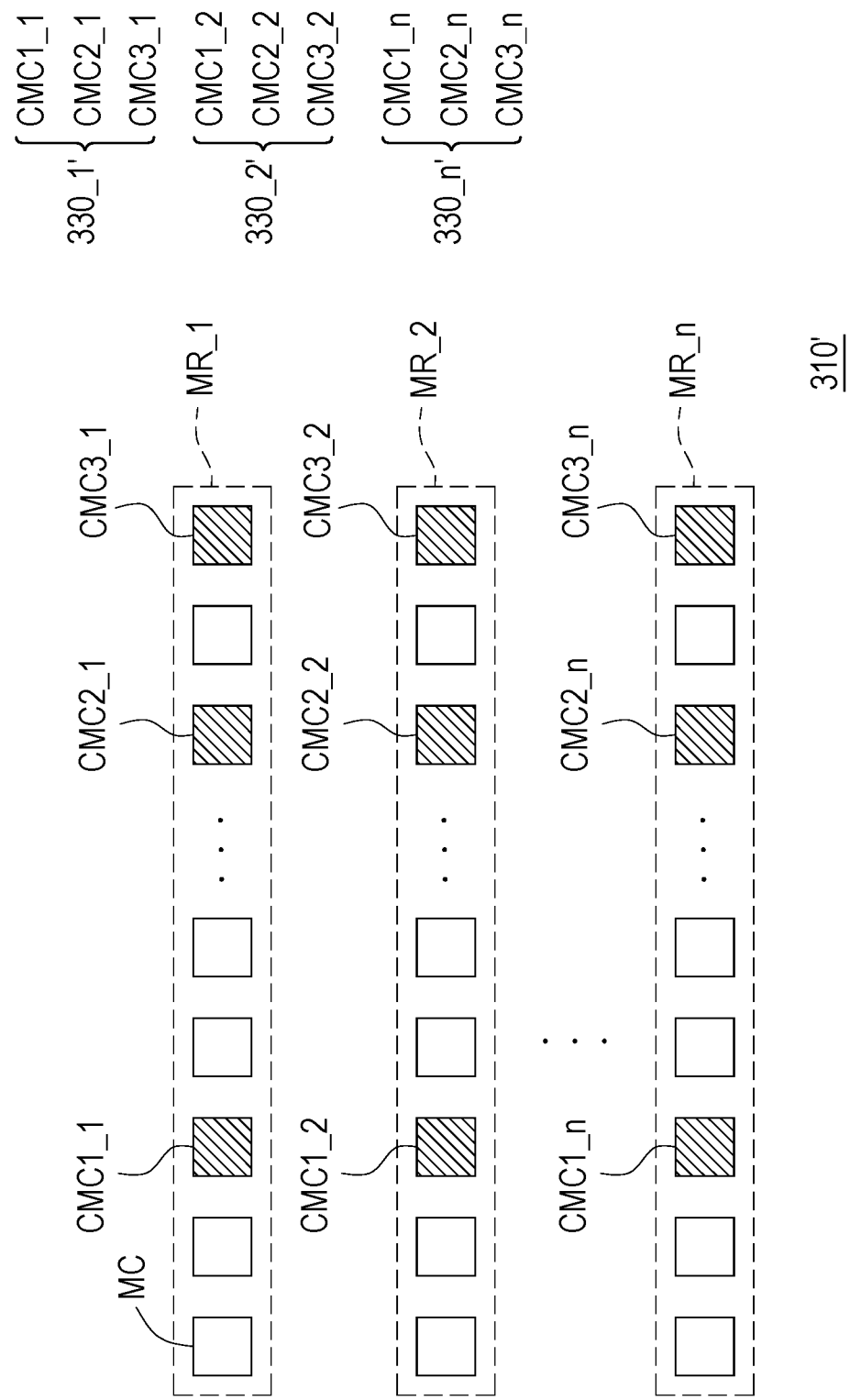
FIG. 5 illustrates a schematic diagram of a memory array according to an embodiment of the disclosure.

FIG. 5 illustrates a schematic diagram of a memory array according to an embodiment of the disclosure. Please refer to FIG. 5, in the embodiment, the memory array 310' includes memory cell rows MR_1 to MR_n. The memory cell rows MR_1 includes memory cells MC and a count value registers 330_1'. The count value registers 330_1' includes memory cells CMC1-1 to CMC3-1 for storing the count value CV1. The memory cells CMC1-1 to CMC3-1 are not adjacent from each other. The memory cell rows MR_2 includes memory cells MC and a count value registers 330_2. The count value registers 330_2 includes memory cells CMC1-2 to CMC3-2 for storing the count value CV2. The memory cells CMC1-2 to CMC3-2 are not adjacent from each other. Similarly, the memory cell rows MR_n includes memory cells MC and a count value registers 330_n. The count value registers 330_n includes memory cells CMC1_n to CMC3_n for storing the count value CVn. The memory cells CMC1_n to CMC3_n are not adjacent from each other. Besides, the memory cells CMC1-1 to CMC1_n are formed as a first memory cell column. The memory cells CMC2-1 to CMC2_n are formed as a second memory cell column. The memory cells CMC3-1 to CMC3_n are formed as a third memory cell column.

Figure 6:
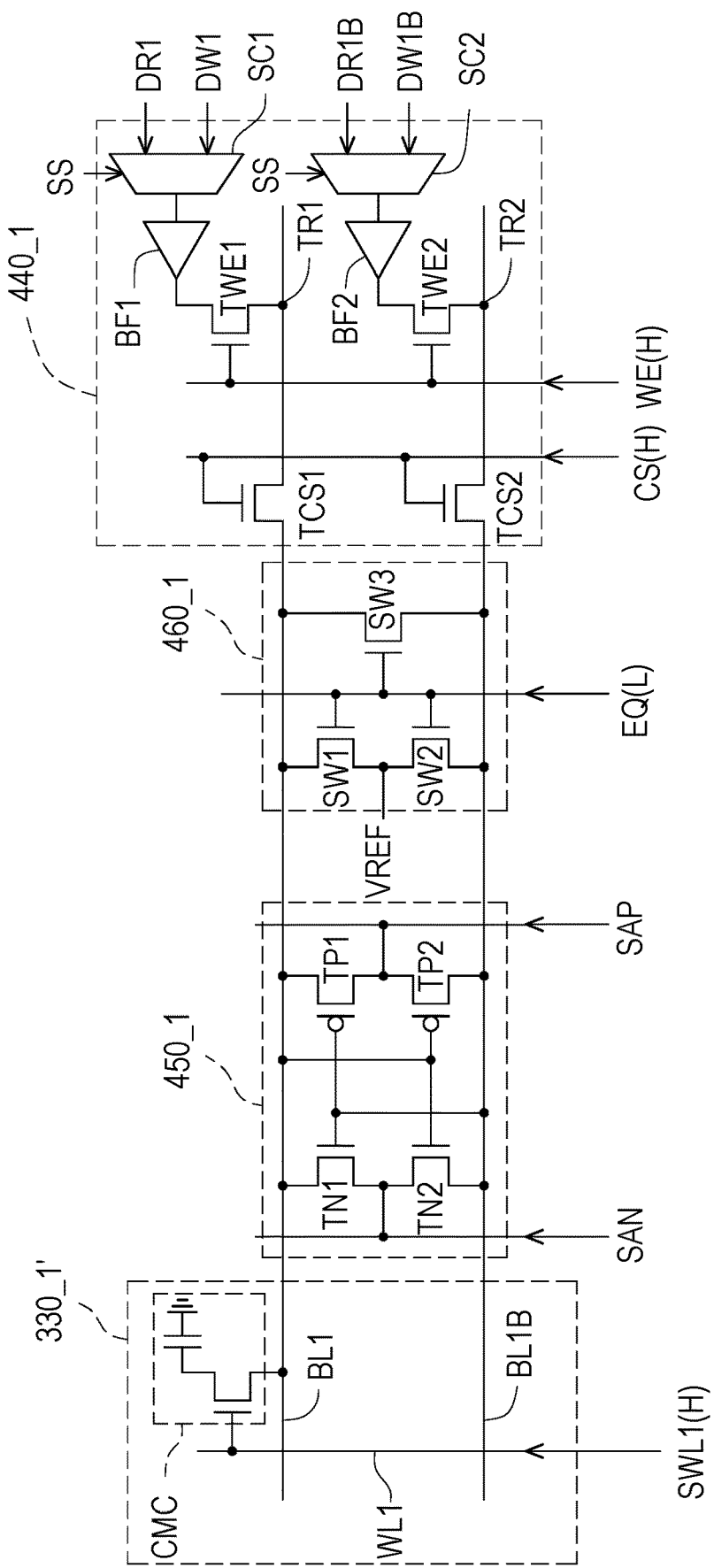
FIG. 6 illustrates a circuit diagram of an input/output circuit, a sensing amplifier, a voltage equalization circuit and a count value register according to an embodiment of the disclosure.
Figure 7:
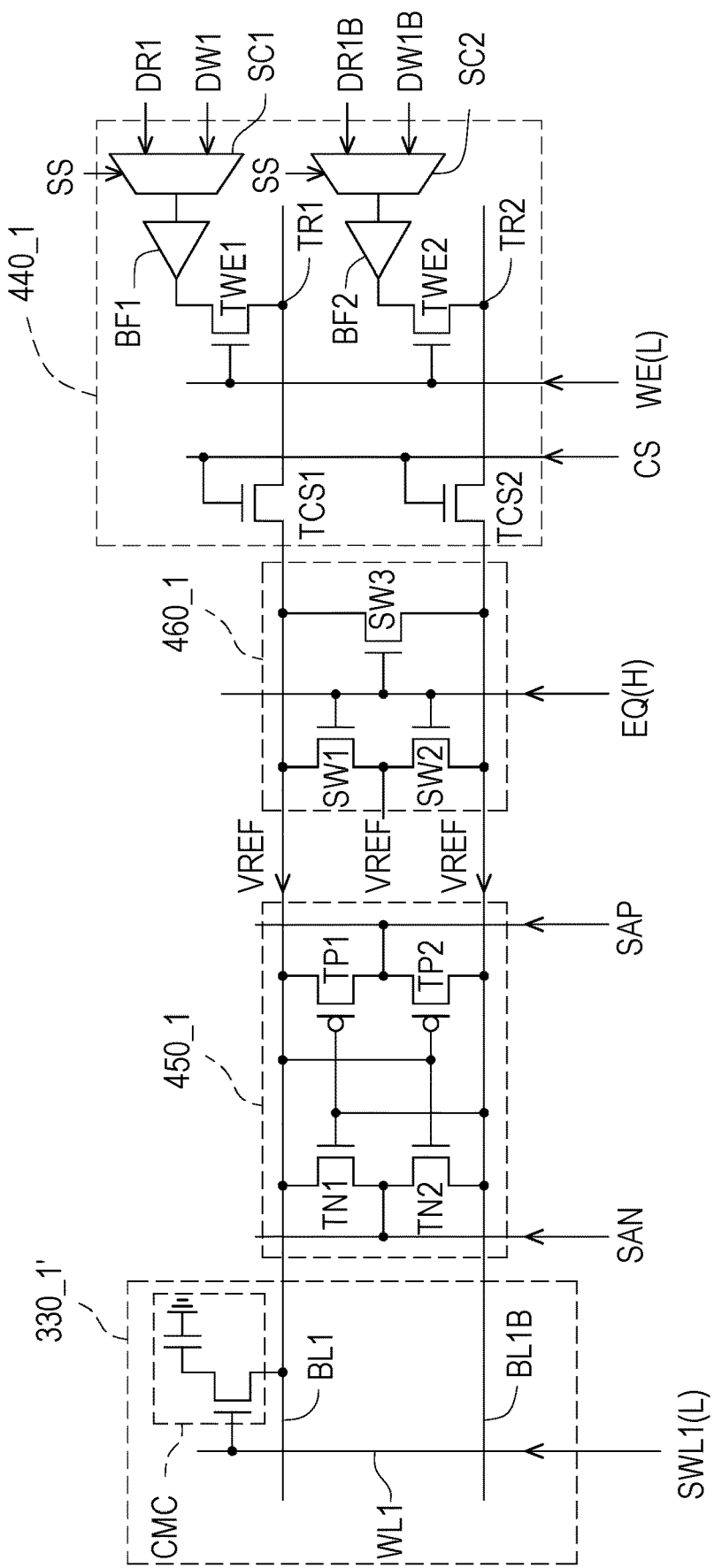
FIG. 7 illustrates an operating diagram for reading a count value of a count value register in a precharge phase according to FIG. 6.

FIG. 6 illustrates a circuit diagram of an input/output circuit, a sensing amplifier, a voltage equalization circuit and a count value register according to an embodiment of the disclosure. Please refer to FIG. 1 and FIG. 6, the memory device includes sensing amplifiers, voltage equalization circuits and count value registers corresponding to memory cell columns of memory array (not shown). In the embodiment, FIG. 7 illustrates an input/output circuit 440_1 among input/output circuits, a sensing amplifier 450_1 among sensing amplifiers, a voltage equalization circuit 460_1 among voltage equalization circuits and the count value register 330_1' among count value registers of the memory device 100.

In the embodiment, the input/output circuit 440_1 is coupled to the memory cell row MR_1 and the control logic circuit 120. The input/output circuit 440_1 is coupled to the count value register 330_1' arranged in the memory cell row MR_1 and the control logic circuit 120. The input/output circuit 440_1 includes selecting circuits SC1, SC2, write enable transistors TWE1, TWE2 and selecting transistors TCS1, TCS2. The selecting circuit SC1 is coupled to the control logic circuit 120. The selecting circuit SC1 outputs one of the reset data DR1 and write data DW1 in response to a mode selecting signal SS. The selecting circuit SC2 is coupled to the control logic circuit 120. The selecting circuit SC2 outputs one of a reset data bar DR1B and a write data bar DW1B in response to the mode selecting signal SS. When resetting the count value register 330_1', the control logic circuit 120 provides the reset data DR1 to the selecting circuit SC1 and provides the reset data bar DR1B to the selecting circuit SC2. The reset data DR1 and the reset data bar DR1B are complement from each other. When performing the write operation on the memory cell rows MR_1, the control logic circuit 120 provides the write data DW1 to the selecting circuits SC1 and provides the write data bar DW1B to the selecting circuit SC2. The write data DW1 and the write data bar DW1B are complement from each other. The selecting circuit SC1 outputs the reset data DR1 to the bit line BL1 in response to the mode selecting signal SS having a first value. The selecting circuit SC2 outputs the reset data bar DR1B to the bit line bar BL1B in response to the mode selecting signal SS having the first value. The selecting circuit SC1 outputs the write data DW1 to the bit line BL1 in response to the mode selecting signal SS having a second value. The selecting circuit SC2 outputs the write data bar DW1B to the bit line bar BL1B in response to the mode selecting signal SS having the second value. Each of the selecting circuits SC1, SC2 may be implemented by a multiplexer (MUX).

A first terminal of the write enable transistor TWE1 is coupled to an output terminal of the selecting circuit SC1. A second terminal of the write enable transistor TWE1 is coupled to a first readout terminal TR1. A control terminal of the write enable transistor TWE1 receives a write enable signal WE. A first terminal of the write enable transistor TWE2 is coupled to an output terminal of the selecting circuit SC2. A second terminal of the write enable transistor TWE2 is coupled to a second readout terminal TR2. A control terminal of the write enable transistor TWE2 receives the write enable signal WE.

A first terminal of the selecting transistor TCS1 is coupled to the first readout terminal TR1. A second terminal of the selecting transistor TCS1 is coupled to the bit line BL1. A control terminal of the selecting transistor TCS1 receives a column selecting signal CS. A first terminal of the selecting transistor TCS2 is coupled to the second readout terminal TR2. A second terminal of the selecting transistor TCS2 is coupled to the bit line bar BL1B. A control terminal of the selecting transistor TCS2 receives the column selecting signal CS.

In the embodiment, the input/output circuit 440_1 further includes buffers BF1, BF2. An input terminal of the buffer BF1 is coupled to the output terminal of the selecting circuit SC1. An output terminal of the buffer BF1 is coupled to the first terminal of the first write enable transistor TWE1. An input terminal of the buffer BF2 is coupled to the output terminal of the selecting circuit SC2. An output terminal of the buffer BF2 is coupled to the first terminal of the second write enable transistor TWE2.

In the embodiment, the sensing amplifier 450_1 includes N-type transistors TN1, TN2 and P-type transistors TP1, TP2. A first terminal of the N-type transistor TN1 is coupled to the bit line BL1. A second terminal of the N-type transistor TN1 receives the first sensing voltage SAN. A control terminal of the N-type transistor TN1 is coupled to the bit line bar BL1B. A first terminal of the N-type transistor TN2 is coupled to the second terminal of the N-type transistor TN1. A second terminal of the N-type transistor TN2 is coupled to the bit line bar BL1B. A control terminal of the N-type transistor TN2 is coupled to the bit line BL1. A first terminal of the P-type transistor TP1 is coupled to the bit line BL1. A second terminal of the P-type transistor TP1 receives the second sensing voltage SAP. A control terminal of the P-type transistor TP1 is coupled to the bit line bar BL1B. A first terminal of the P-type transistor TP2 is coupled to the second terminal of the P-type transistor TP1. A second terminal of the P-type transistor TP2 is coupled to the bit line bar BL1B. A control terminal of the P-type transistor TP2 is coupled to the bit line BL1.

In the embodiment, the voltage equalization circuit 460_1 includes switches SW1 to SW3. a first terminal of the switch SW1 is coupled to the bit line BL1. A second terminal of the switch SW1 receives the reference voltage VREF. A control terminal of the switch SW1 receives an equalization signal EQ. A first terminal of the switch SW2 receives the reference voltage VREF. A second terminal of the switch SW2 is coupled to the bit line bar BL1B. A control terminal of the second switch receives the equalization signal EQ. A first terminal of the switch SW3 is coupled to the bit line BL1. A second terminal of the switch SW3 is coupled to the bit line bar BL1B. A control terminal of the switch SW3 receives the equalization signal EQ.

In the embodiment, each of the write enable transistors TWE1, TWE2, the selecting transistors TCS1, TCS2, the N-type transistors TN1, TN2 and the switches SW1 to SW3 may be implemented by a NMOS transistor. Each of the P-type transistors TP1, TP2 may be implemented by a PMOS transistor.

In the embodiment, when the control logic circuit 120 resets the count value stored in the memory cell CMC, the write enable signal WE and the column selecting signal CS have high voltage level "H". The equalization signal EQ has low voltage level "L". Therefore, the write enable transistors TWE1, TWE2 and the selecting transistors TCS1, TCS2 are turned-on in response to the high voltage level "H" of the write enable signal WE and the high voltage level "H" of the column selecting signal CS. The input/output circuit 440_1 provides the reset data DR1 to the bit line BL1 and provides the reset data bar DR1B to the bit line bar BL1B. The switches SW1 to SW3 are turned-off in response to the low voltage level "L" of the equalization signal EQ. Therefore, the voltage equalization circuit 460_1 is disabled in response to the low voltage level "L" of the equalization signal EQ.

Besides, a memory cell CMC of the count value register 330_1' receives a word line signal SWL1 having high voltage level "H" through a word line WL1. The memory cell CMC is selected. Therefore, the reset data DR1 is written into the memory cell CMC. The memory cell CMC is reset. The reset data DR1 in the memory cell CMC is an initial data before the count value register 330_1' counts the write operation of the access performed on the memory cell row MR_1.

In the embodiment, the mode selecting signal SS, the column selecting signal CS, the write enable signal WE and the equalization signal EQ may be provided by the control logic circuit 120.

FIG. 7 illustrates an operating diagram for reading a count value of a count value register in a precharge phase according to FIG. 6. Please refer to FIG. 1 and FIG. 7, in the embodiment, when the control logic circuit 120 reads a bit data of the count value of the count value register 330_1', the equalization signal EQ has high voltage level "H" in the precharge phase. The switches SW1 to SW3 are turned-on in response to the high voltage level "H" of the equalization signal EQ. The voltage equalization circuit 460_1 is enabled in the precharge phase. In the precharge phase, the voltage equalization circuit 460_1 precharges the bit line BL1 and the bit line bar BL1B with the reference voltage VREF. Therefore, voltage values of the voltages on the bit line BL1 and the bit line bar BL1B is substantially equal to a voltage value of the reference voltage VREF. For example, the voltage value of the reference voltage VREF is half of a system voltage of the memory device 400, but the disclosure is not limited thereto.

The memory cell CMC of the count value register 330_1' receives the word line signal SWL1 having low voltage level "L" through a word line WL1. Therefore, the memory cell CMC cannot output the bit data of the count value.

Besides, when the control logic circuit 120 reads a bit data of the count value of the count value register 330_1', the write enable signal WE has low voltage level "L". Therefore, the input/output circuit 440_1 stops transmitting any data when the control logic circuit 120 reads a bit data of the count value of the count value register 330_1'.

Figure 8:
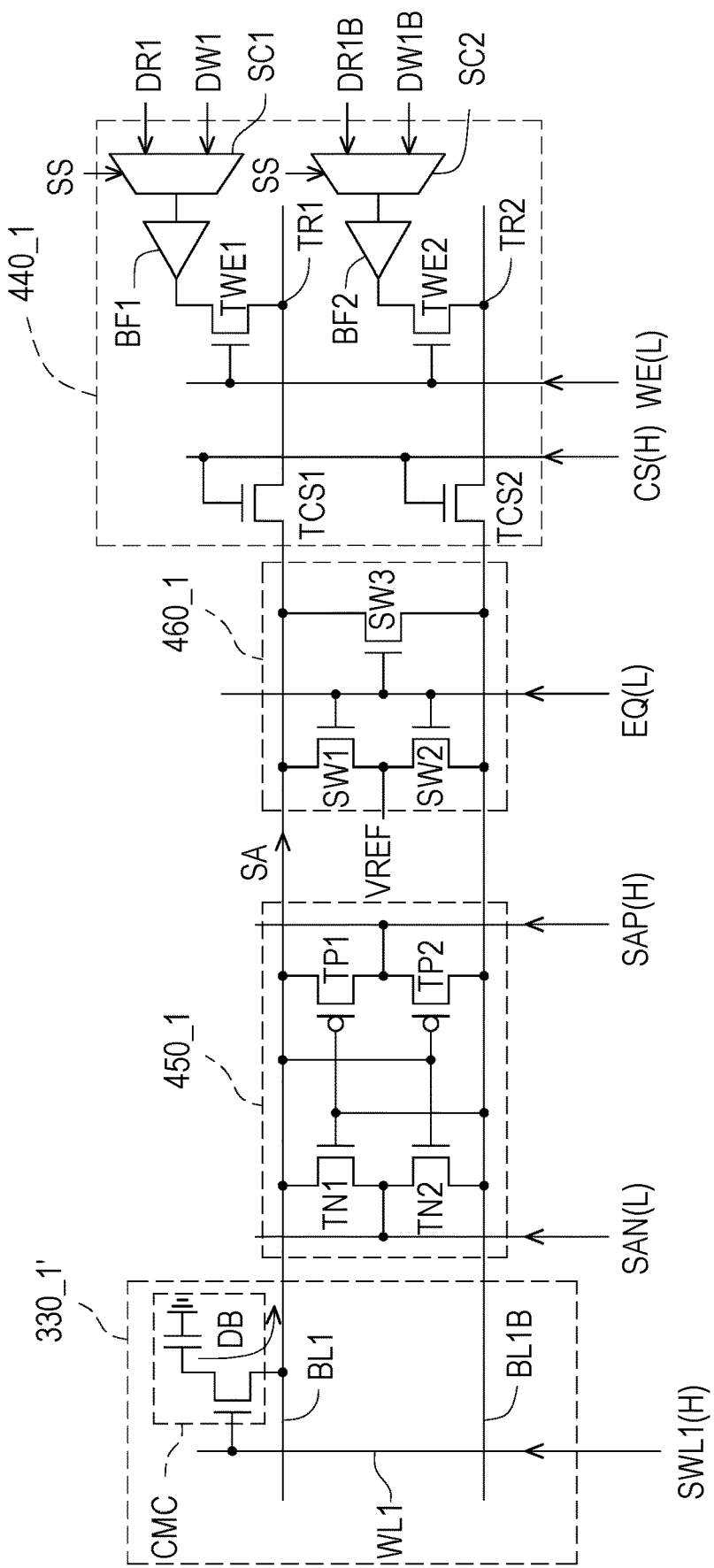
FIG. 8 illustrates an operating diagram for reading a count value of a count value register according to FIG. 6.

FIG. 8 illustrates an operating diagram for reading a count value of a count value register in an access phase and a sensing phase according to FIG. 7. Please refer to FIG. 6 and FIG. 8, in the embodiment, after the precharge phase, the voltage equalization circuit 460_1 is disabled in response to the low voltage level "L" of the equalization signal EQ in the access phase. The memory cell CMC receives the word line signal SWL1 having low voltage level "H" through a word line WL1 and output the bit data DB to the bit line BL in the access phase. When the bit line BL is "1", the voltage value on the bit line BL is higher than the voltage value of the reference voltage VREF. When the bit line BL is "0", the voltage value on the bit line BL is lower than the voltage value of the reference voltage VREF.

The sensing amplifier 450_1 selects one of the first sensing voltage SAN and the second sensing voltage SAP as an output sensing voltage SA according to the bit data DB of the count value in the sensing phase. The first sensing voltage SAN has low voltage level "L". The second sensing voltage SAP has high voltage level "H".

For example, when the bit line BL is "1", the voltage value on the bit line BL is higher than the voltage value of the reference voltage VREF. The P-type transistor TP2 is turned-off. The N-type transistor TN2 is turned-on and transmits the first sensing voltage SAN to the bit line bar BL1B. The voltage value on the bit line bar BL1B has the low voltage level "L". Therefore, The N-type transistor TN1 is turned-off. The P-type transistor TP1 is turned-on and transmits the second sensing voltage SAP to the bit line BL1. The voltage value on the bit line BL1 has the high voltage level "H". Therefore, when the bit line BL is "1", the voltage value on the bit line bar BL1B has the low voltage level "L". The voltage value on the bit line BL1 has the high voltage level "H". In the sensing phase, the column selecting signal CS have high voltage level "H". In other words, when the bit line BL is "0", the sensing amplifier 450_1 selects the second sensing voltage SAP as the output sensing voltage SA. When the bit line BL is "0", the input/output circuit 440_1 outputs the high voltage level "H" to the first readout terminal TR1 and outputs the low voltage level "L" to the second readout terminal TR2.

Besides, the sensing amplifier 450_1 restores the memory cell CMC with the second sensing voltage SAP. Therefore, the bit data DB stored in the memory cell CMC is not changed when the control logic circuit 120 reads a bit data of the count value of the count value register 330_1'.

For example, when the bit line BL is "0", the voltage value on the bit line BL is lower than the voltage value of the reference voltage VREF. The N-type transistor TN2 is turned-off. The P-type transistor TP2 is turned-on and transmits the second sensing voltage SAP to the bit line bar BL1B. The voltage value on the bit line bar BL1B has the high voltage level "L". Therefore, The P-type transistor TP1 is turned-off. The N-type transistor TN1 is turned-on and transmits the first sensing voltage SAN to the bit line BL1. The voltage value on the bit line BL1 has the low voltage level "L". Therefore, when the bit line BL is "0", the voltage value on the bit line bar BL1B has the low voltage level "H". The voltage value on the bit line BL1 has the high voltage level "L". In other words, when the bit line BL is "0", the sensing amplifier 450_1 selects the first sensing voltage SAA as the output sensing voltage SA. When the bit line BL is "0", the input/output circuit 440_1 outputs the low voltage level "L" to the first readout terminal TR1 and outputs the high voltage level "H" to the second readout terminal TR2.

Besides, the sensing amplifier 450_1 restores the memory cell CMC with the first sensing voltage SAN. Therefore, the bit data DB stored in the memory cell CMC is not changed when the control logic circuit 120 reads a bit data of the count value of the count value register 330_1'.

Figure 9:
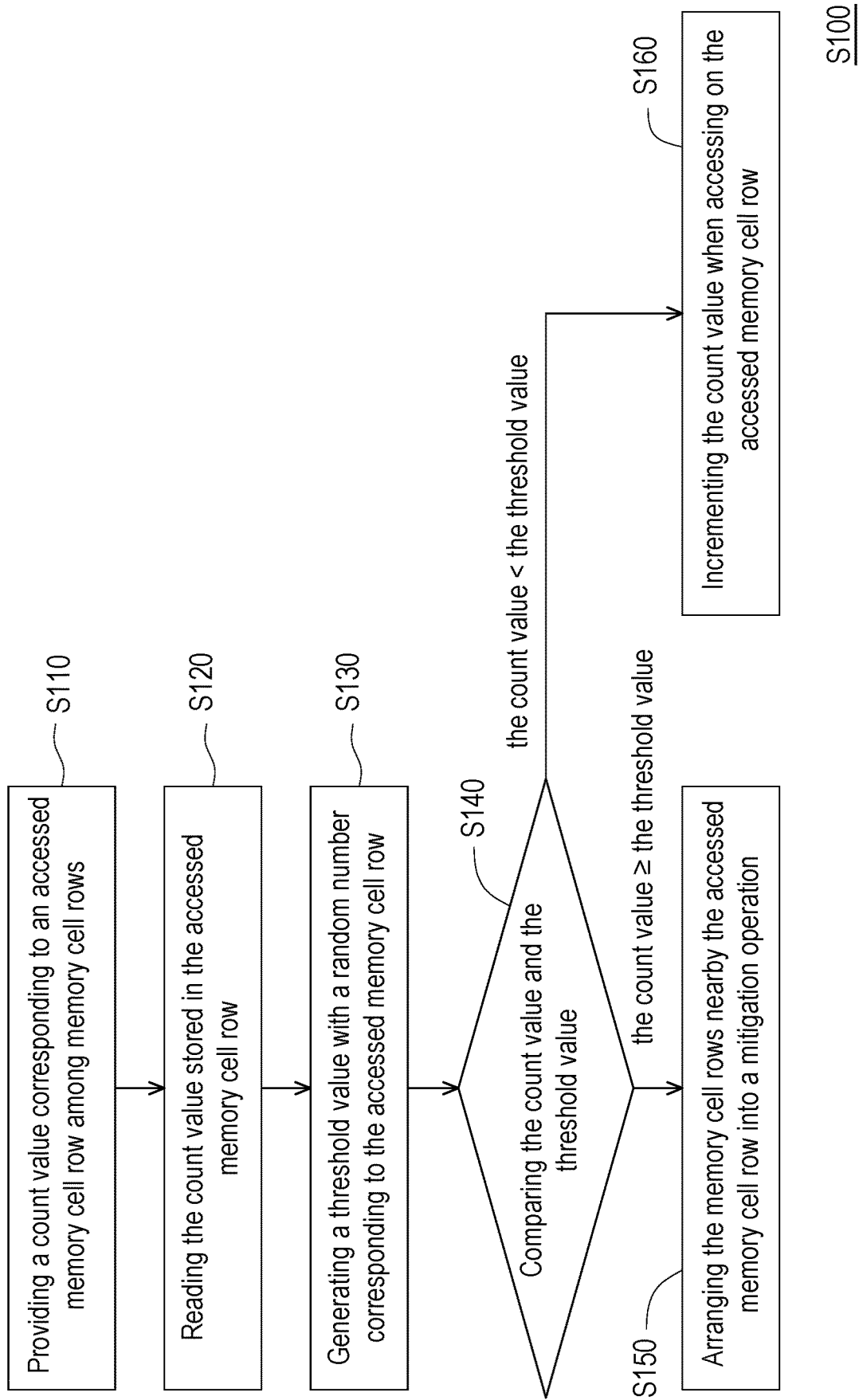
FIG. 9 illustrates a flow chart of a control method according an embodiment of the disclosure.

FIG. 9 illustrates a flow chart of a control method according an embodiment of the disclosure. Please refer to FIG. 1 and FIG. 9, in the embodiment, the control method S100 is applicable to the memory device 100. The control method S100 includes steps S110 to S160. In the step S110, a count value corresponding to an accessed memory cell row among memory cell rows MR_1 and MR_n is provided. In the step S120, the control logic circuit 120 reads the count value stored in the accessed memory cell row. In the step S130, the control logic circuit 120 generates a threshold value with a random number corresponding to the accessed memory cell row. In the embodiment, for example, the control logic circuit 120 generates the threshold value TV1 when comparing the count value CV1 corresponding to an accessed memory cell row MR_1. The control logic circuit 120 generates the threshold value TV2 when comparing the count value CV2 corresponding to an accessed memory cell row MR_2. It should be noted, the threshold values TV1 to TVn are random values respectively. Besides, for example, the threshold value TV1 includes a first number of bits. The threshold value TV1 includes a second number of random bits in the first number. The first number is larger than or equal to the second number. The random value bits of the threshold value TV1 in the threshold value segment 2231 are shifted based on the time length TD (for example, the refresh period of the memory device).

In the step S140, the comparator 122 compares the count value and the threshold value. When the count value is larger than or equal to the threshold value, the control logic circuit 120 arranges the memory cell rows nearby the accessed memory cell row into a mitigation operation in the step S150. Then the control logic circuit 120 returns to the step S110.

On the other hand, when the count value is lower than the threshold value, increments the count value is incremented when accessing on the accessed memory cell row. Then the control logic circuit 120 performs the access on the memory array 110 in the step S120. The detail operation of steps S110 to S160 has been clearly explained in the embodiments of FIG. 1 to FIG. 8, so it will not be repeated here.

In view of the foregoing, the threshold values are random values respectively The threshold values generated the when reading a corresponding count value. The threshold values are set again based on the time length. The external attackers cannot obtain the threshold values. The external attacker cannot obtain the mitigation operation of the disclosure. Therefore, the memory device mitigates a row-hammer attacks from the external attacker. Besides, the random value bits of the threshold value are shifted in the threshold value segment. Therefore, it is not easy for the external attackers to know the threshold value.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory device, comprising:
a memory array, comprising a plurality of memory cell rows; and
a control logic circuit, coupled to the memory array, configured to perform an access on the memory array, wherein the control logic circuit comprises:
a counter, configured to count a number of the access performed on the plurality of memory cell rows to generate a count value corresponding to the accessed memory cell row among the plurality of memory cell rows;
a random value generator, configured to generate a threshold value with random value corresponding to the accessed memory cell row; and
a comparator, configured to compare the threshold value and the count value;
wherein when the count value corresponding to the accessed memory cell row is larger than or equal to the threshold value, the control logic circuit arranges the memory cell rows nearby the accessed memory cell row into a mitigation operation.

2. The memory device of claim 1, wherein when the count value is lower than the threshold value, the counter increments the count value of the accessed memory cell row.

3. The memory device of claim 1, wherein when the control logic circuit reads the count value from the accessed memory cell row, the random value generator generates the threshold value corresponding to the accessed memory cell row for comparing the count value.

4. The memory device of claim 1, wherein the random value generator generates the threshold value with a linear feedback shift register.

5. The memory device of claim 1, wherein the threshold value comprises a first number of bits, wherein a second number of bits in the first number of bits of the threshold value are generated by the random value generator, and
wherein the first number is larger than or equal to the second number, the second number is larger than zero.

6. The memory device of claim 5, wherein the second number of bits are shifted in the first number of bits based on a time length.

7. The memory device of claim 1, wherein the control logic circuit resets the count value stored in the plurality of memory cells of the memory cell row by overwriting a reset data based on a time length or after arranging the memory cell rows nearby a first memory cell row into the mitigation operation.

8. The memory device of claim 7, further comprising:
a plurality of input/output circuits, wherein a first input/output circuit among the plurality of input/output circuits is coupled to a memory cell of the memory cell row and the control logic circuit, and
wherein when the control logic circuit resets the count value stored in the memory cell, the first input/output circuit transmits the reset data to the memory cell by a writing operation.

9. The memory device of claim 8, wherein the first input/output circuit comprises:
a selecting circuit, coupled to the control logic circuit, configured to selectively output the reset data in response to a mode selecting signal.

10. A control method for controlling a memory device, comprising:
providing a count value corresponding to an accessed memory cell row among a plurality of memory cell rows;
reading the count value stored in the accessed memory cell row;
generating a threshold value with a random number corresponding to the accessed memory cell row;
comparing the count value and the threshold value; and
arranging the memory cell rows nearby the accessed memory cell row into a mitigation operation when the count value is larger than or equal to the threshold value.

11. The control method of claim 10, further comprising:
resetting the count value to an initial value when the count value is larger than or equal to the threshold value.

12. The control method of claim 10, wherein a portion of bits of the threshold value is generated by the random number.

13. The control method of claim 12, wherein the portion of bits of threshold value generated by the random number is shift within the range of bits of the threshold value based on a time length.

14. The control method of claim 13, wherein the time length is a refresh period of the memory device.

15. The control method of claim 10, further comprising:
refreshing the memory cell rows nearby the accessed memory cell row in the mitigation operation.

* * * * *